(12) United States Patent
Lin

(10) Patent No.: US 8,217,601 B2
(45) Date of Patent: Jul. 10, 2012

(54) ROBUST ROTATIONAL POSITION ALIGNMENT USING A RELATIVE POSITION ENCODER

(75) Inventor: Yun-Chich "Jack" Lin, Norwich, NY (US)

(73) Assignee: Parker-Hannifin Corporation, Cleveland, OH (US)

( * ) Notice: Subject to any disclaimer, the term of this patent is extended or adjusted under 35 U.S.C. 154(b) by 316 days.

(21) Appl. No.: 12/698,506

(22) Filed: Feb. 2, 2010

(65) Prior Publication Data

US 2011/0025243 A1 Feb. 3, 2011

Related U.S. Application Data

(60) Provisional application No. 61/229,310, filed on Jul. 29, 2009.

(51) Int. Cl.
*H02P 6/04* (2006.01)

(52) U.S. Cl. ............. 318/400.11; 318/400.33; 318/276; 318/560; 318/561; 318/636; 310/36; 310/216.094; 310/166; 310/159; 310/171; 324/207.2; 324/207.16; 388/833

(58) Field of Classification Search ............. 318/400.11, 318/721, 724, 119, 128, 592, 593, 594, 276, 318/560, 400.33; 388/833; 310/166, 216.094, 310/36, 171, 156.47, 207.25, 179, 49.55, 310/168, 159; 324/207.2, 207.25, 207.16; 269/55; 347/237

See application file for complete search history.

(56) References Cited

U.S. PATENT DOCUMENTS

| | | | |
|---|---|---|---|
| 3,835,358 A | 9/1974 | Schuler | |
| 5,003,238 A | 3/1991 | Lum et al. | |
| RE34,355 E | 8/1993 | Takahashi et al. | |
| 5,736,797 A | 4/1998 | Motohashi et al. | |
| 5,773,908 A | 6/1998 | Stephens et al. | |
| 6,522,130 B1 | 2/2003 | Lutz | |
| 6,734,666 B2 | 5/2004 | Voillat | |
| 6,781,368 B2 | 8/2004 | Grueger et al. | |
| 7,023,155 B2 * | 4/2006 | Tieu | 318/276 |
| 7,030,531 B2 | 4/2006 | Haner | |
| 2003/0184170 A1 | 10/2003 | Kurnia et al. | |
| 2010/0225262 A1 * | 9/2010 | Matsuo et al. | 318/400.33 |

* cited by examiner

*Primary Examiner* — Walter Benson
*Assistant Examiner* — Jorge Carrasquillo
(74) *Attorney, Agent, or Firm* — Renner, Otto, Boisselle & Sklar, LLP

(57) ABSTRACT

A robust method for detecting a relative position of a feedback device, such as an encoder or resolver, coupled to a shaft, such as a motor shaft, is provided. To detect the relative position, electrical commands are issued in an open loop mode to spin the motor shaft an amount greater than the apparent rotational angle between two consecutive markers of the position feedback device, such that the net mechanical rotation is equal to or greater than the total rotational angle between two consecutive markers.

19 Claims, 2 Drawing Sheets

ROBUST ROTATIONAL POSITION ALIGNMENT USING A RELATIVE POSITION ENCODER

RELATED APPLICATION DATA

This application claims priority of U.S. Provisional Application No. 61/229,310 filed on Jul. 29, 2009, which is incorporated herein by reference in its entirety.

FIELD OF THE INVENTION

The present invention relates generally to motor control and, more particularly, to aligning a relative angular position of a position feedback device, such as an encoder or a resolver, with a motor shaft.

BACKGROUND

Position feedback devices, such as encoders and resolvers, for example, are used to monitor the motion of devices, such as a motor shaft, for example. Generally, the position of the shaft is monitored in terms of angular position and/or number of revolutions. Encoders typically use a code wheel attached to the shaft to modulate light as the shaft and the code wheel rotate, while resolvers use rotating windings (e.g., a rotating transformer) to determine an angular position of the shaft.

In motor control systems, an initialization routine is typically executed that enables the control software to determine a mechanical angular position of the motor rotor by reading the output of the position feedback device. Knowing the mechanical angular position of the rotor, the software can generate proper electrical commutation to most efficiently drive the motor rotor in a forward direction.

For electrical motor designs wherein the mechanical turn for a full electrical cycle is not same as that of a full position feedback turn (e.g., less than one full resolver turn, also referred to as one electrical cycle of the resolver, or the resolver turn is not an integer multiple of the electrical turn), the position feedback device does not provide a unique translation from the position feedback device to the electrical angular position for commutation. A conventional method for implementing the initialization routine is to issue electrical commands to spin the motor rotor in open loop mode to provide a desired rotational angle of the position feedback device. However, for various reasons the motor initialization may fail to establish the correct mechanical angular position and hence the electrical angle for commutation. When this happens, the motor may run inefficiently, stall, or, depending on the initial rotor position, could run backward. This initialization is needed for any motor design that does not provide a one-to-one mapping from the position feedback device reading to the electrical position determination for commutation.

For example, if a 6-pole motor is coupled to a position feedback device embodied as a resolver that has two full electrical cycles for each mechanical revolution, reading the resolver output alone does not provided certainty with regard to which mechanical half turn the resolver is referencing. The resolver indicated position and the actual mechanical position either is correct or off by 180 degrees. When the position is correct, the motor will run in the forward direction. When the position is off by 180 degrees, the motor may run backwards, depending on the initial starting position.

SUMMARY OF INVENTION

It has been discovered that failure of the initialization routine can be tied to improper rotation of the rotating member (and thus of the position feedback device). For example, if the rotating member (e.g., an AC motor rotor) is commanded to rotate a specified angular displacement but, due to finite dynamic response or load on the rotating member (e.g., viscous fuel at low temperature) the rotating member rotates more slowly than expected, it may not achieve the desired angular displacement within a specified time period. Another issue that may affect the initialization routine is manufacturing tolerances within the feedback device itself as well as the alignment of the marker with respect to electrical angle for commutation (during manufacture alignment of the marker may be arbitrary—such arbitrary alignment could be addressed via a calibration step. For example, the feedback device may have a number of markers located at predetermined angular positions. Due to manufacturing tolerances, however, these markers may not be where they are expected to be. Thus, even if the rotating member executes the desired angular displacement within the predetermined time period, in certain circumstances it is possible that one or more markers are not detected during initialization. These issues can lead to improper alignment between the rotating member and an angular position of the feedback device.

A method and apparatus in accordance with the present invention enable accurate and robust detection of an angular position of a feedback device, such as an encoder or resolver, relative to a rotating member coupled to the position feedback device without additional hardware. More particularly, a rotating member, such as a motor rotor, coupled to the position feedback device is commanded to execute an angular move such that the total angular displacement of the motor rotor ensures that more than one electrical cycle of the feedback device is completed (e.g., the electrical angular rotation of the position feedback device is greater than an apparent angular displacement between two consecutive markers of the position feedback device). This enables at least one marker of the feedback device to be detected during initialization.

According to one aspect of the invention, a device for aligning a relative position feedback device to a motor rotor is provided, wherein a rotatable input of the relative position feedback device is coupled to the motor rotor so as to rotate therewith, the relative position feedback device having at least one marker indicative of a location of the rotatable input within one electrical cycle of the relative position feedback device. The device includes: a processor and memory operatively coupled to the processor; and logic stored in the memory and executable by the processor so as to cause the processor to: rotate the motor rotor a non-zero offset angular distance plus a predetermined angular distance corresponding to one electrical cycle of the relative position feedback device; while the motor rotor is rotating, initialize a counter upon detection of the at least one marker; command the motor rotor to at least one predetermined angular location; obtain data stored in the counter at the at least one predetermined angular location; and based on the obtained data, determine a location of the motor rotor with confirmation relative to the at least one marker.

According to one aspect of the invention, the logic that commands the motor rotor to at least one predetermined angular location includes logic that commands the motor rotor no further rotation after the motor rotor has rotated the predetermined angular distance and the offset angular distance.

According to one aspect of the invention, the offset angular distance corresponds to at least one of dynamics of the motor and a load coupled to the motor, or tolerances of the feedback device.

According to one aspect of the invention, the logic that commands the motor rotor to at least two predetermined angular locations includes logic that: commands the motor rotor to an initial location; and after a predetermined time period, commands the motor to index to at least one check point.

According to one aspect of the invention, the logic that commands the motor rotor to an initial location comprises logic that commands the motor rotor to a location corresponding to 0 or other fixed degrees of the motor rotor electrical cycle.

According to one aspect of the invention, the device further includes a control loop for controlling rotation of the motor rotor, wherein the control loop comprises an open-loop control methodology.

According to one aspect of the invention, the device further includes logic that verifies the determined relationship of the motor rotor relative to the at least one marker.

According to one aspect of the invention, a drive system includes a device for aligning a relative position feedback device to a motor rotor as described herein, and a relative position feedback device having a plurality of electrical cycles for each mechanical revolution of the rotatable input.

According to one aspect of the invention, the relative position feedback device is at least one of a resolver or an optical type of encoder.

According to one aspect of the invention, a method for aligning a relative position feedback device to a motor rotor is provided, wherein a rotatable input of the relative position feedback device is coupled to the motor rotor so as to rotate therewith, the relative position feedback device having at least one marker indicative of a location of the rotatable input within one electrical cycle of the relative position feedback device. The method includes: rotating the motor rotor a non-zero offset angular distance plus a predetermined angular distance corresponding to one electrical cycle of the relative position feedback device; while the motor rotor is rotating, initializing a counter upon detection of the at least one marker; commanding the motor rotor to at least one predetermined angular location; obtaining data stored in the counter at the at least one predetermined angular location; and based on the obtained data, determining a location of the motor rotor relative to the at least one marker.

According to one aspect of the invention, the commanding step is performed after the motor rotor as rotated the predetermined angular distance and the offset angular distance.

According to one aspect of the invention, the offset angular distance corresponds to at least one of dynamics of the motor and load coupled to the motor, or tolerances of the feedback device.

According to one aspect of the invention, commanding the motor includes: commanding the motor rotor to an initial location; and after a predetermined time period, commanding the motor to index to at least one check point.

According to one aspect of the invention, commanding the motor to an initial location comprises commanding the motor rotor to a location corresponding to 0 degrees of the motor rotor electrical cycle.

According to one aspect of the invention, the relative position feedback device has a plurality of electrical cycles for each mechanical revolution of the rotatable input.

According to one aspect of the invention, the relative position feedback device is at least one of a resolver or an encoder.

According to one aspect of the invention, rotating includes rotating the motor shaft using an open-loop control methodology.

According to one aspect of the invention, the method further includes verifying the determined relationship of the motor rotor relative to the at least one marker.

According to one aspect of the invention, the offset angular distance is between 0 degrees and 180 degrees of the motor rotor electrical cycle for commutation.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

DETAILED DESCRIPTION

The principles of the invention will now be described with reference to the drawings, wherein like reference numbers refer to like components throughout.

A method and device in accordance with the present invention enable a relative position feedback device to accurately and robustly provide absolute position feedback. As used herein, a relative position feedback device is a device that provides relative angular information with respect to a reference point, e.g. North Mark, and the angular information is a multiple of the mechanical angle of the feedback device's shaft. Such relative position feedback device, when coupled to a motor that does not have a unique mapping with the relative position feedback device (e.g., a 1:1 mapping such that the number of motor electrical cycles per revolution are equal to the number of feedback device electrical cycles per revolution) cannot directly provide angular position of the motor rotor within one mechanical revolution. An absolute position feedback device is a device that provides angular information that can be used to directly determine the mechanical angle of the feedback device's shaft and, thus, an angular position of the shaft, that is uniquely mapped to the electrical angular position for commutation, within one mechanical revolution can be directly obtained from data provided by the position feedback device)

In controlling AC motors, it is desirable to know the absolute angular position of the motor rotor, as this enables accurate calculation of the PWM (pulse width modulation) pattern to maintain precise control of the controlled parameter (e.g., speed or torque of the motor). More particularly, feedback information is used to calculate the exact vector of voltage and frequency to attain the goal. Typically, a shaft encoder, resolver, or the like is coupled to the motor to give positive shaft position indication to a motor controller.

Figure 1:
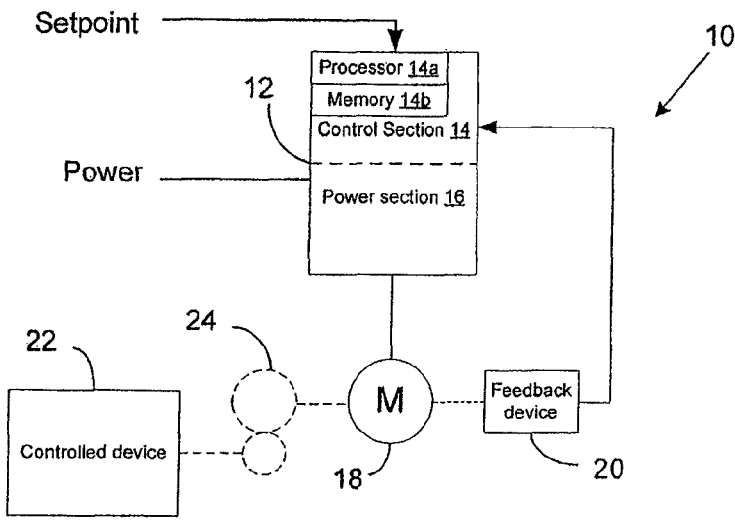
FIG. 1 is a schematic diagram illustrating an exemplary motor control system.

Referring to FIG. 1, there is shown an exemplary motor control system 10. The system 10 includes a controller 12 (also referred to as a "drive"), which receives power from a power source (not shown). The power provided to the controller 12 may be 115 VAC, 60 Hz, although other voltage ranges and/or frequencies may be utilized. The controller 12 includes a control section 14, and a power section 16. The power section 16 converts the incoming power to a voltage level and frequency as determined by the control section 14. Typically, the power section 16 includes a rectifier for generating a DC bus, and a plurality of IGBTs (insulated-gate bipolar transistor) or the like for converting the DC voltage back to an AC signal (e.g., via PWM). Alternatively, the power section may not include a rectifier and instead be directly coupled to a separately generated DC bus. An AC motor 18 is electrically coupled to the power section 16 so as to receive electrical power therefrom, and a feedback device 20, such as an encoder or resolver, is mechanically coupled to the motor 18 so as to rotate therewith. The feedback device also is coupled to the control section 14 so as to provide position feedback data thereto (e.g., position feedback regarding the angular position of the motor shaft). The motor may be mechanically coupled to another device 22, such as a pump, etc., via a gear reducer 24, for example, so as to effect pumping of a fluid.

The control section 14, which in the exemplary embodiment includes a processor 14*a* and memory 14*b*, receives a setpoint parameter (e.g., a target speed, torque, etc. for the motor), for example, from a master controller (not shown), and generates control signals for the power section 16 so as to drive the motor 18 to achieve the setpoint (e.g., if the setpoint is motor revolutions per minute (RPM), then the control section 14 will generate control signals such that the motor 18 will rotate at the specified RPM). In generating the control signals, the control section 14 utilizes information from the feedback device 20. In this manner, the control section 14 can determine an angular velocity of the motor rotor as well as an angular position of the motor rotor.

If the feedback device 20 is an absolute feedback device, then the position of the motor rotor can be readily ascertained by determining the angular position of the feedback device (provided a calibration step has been performed to determine the relationship between the position feedback device angular position and the rotor angular position). If the feedback device 20 is a relative feedback device, however, additional steps need to be taken in order to determine an angular position of the rotor from the relative feedback device. For example, for a 6-pole motor coupled to a position feedback device that provides two electrical cycles per mechanical revolution, it must be determined which half of the mechanical rotation the rotor is in to correctly and uniquely map the electrical angle for commutation. As will be appreciated, determination of which particular cycle the rotor is in is dependent on the number of poles in the motor and the type of feedback device (e.g., for an X3 feedback device (three electrical cycles per mechanical revolution), it will be determined which one-third cycle the rotor is in and the feedback device does not provide a one-to-one mapping to the electrical angle for commutation).

Conventionally, the initialization routine rotates the motor rotor in open loop mode to provide a total apparent rotational angle of the position feedback device that corresponds to an angular displacement between two consecutive markers (i.e., a target angular displacement). However, and as noted above, in certain circumstances this target angular displacement is not achieved within a predetermined time period (e.g., due to finite dynamic response or loads on the motor) or even if achieved, it may be insufficient to detect at least one marker (e.g., due to initial motor position, finite dynamic response of the motor and the exact location of the markers in the feedback device). This can result in an alignment error and/or the motor potentially stalling or running backward for certain motor configurations.

Figure 2:
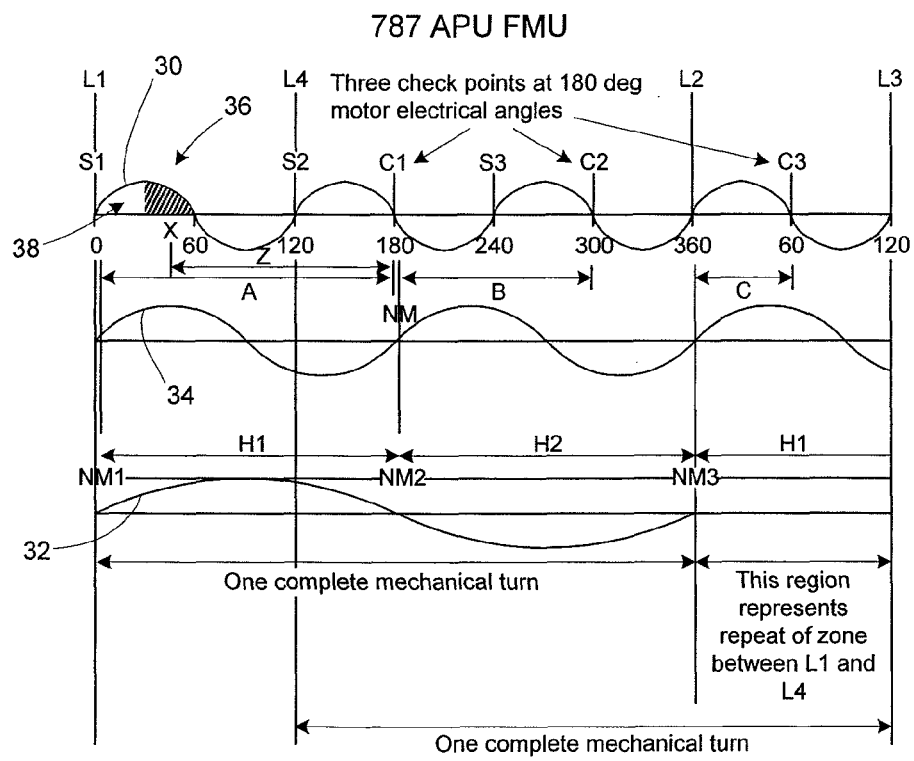
FIG. 2 is a graph showing the relationship between various waveforms in motor control system.

To illustrate the problem, a 6-pole motor will be examined. As will be appreciated, an electrical waveform of a 6-pole motor will go through three complete electrical commutation cycles for one complete mechanical revolution of the motor rotor. This is shown in FIG. 2, wherein the motor electrical waveform is given the reference indicator 30 and the motor mechanical waveform is given the reference indicator 32. Coupled to the motor is a resolver configured for two complete electrical cycles for each complete mechanical revolution of the resolver input shaft, and the resolver electrical waveform is shown in FIG. 2 by the reference indicator 34.

Data generated by the resolver is provided to a resolver to digital converter (RDC) (e.g., located in the control section 14), wherein the resolver sine/cosine signals are converted to angular position, and the RDC converts the rotor angular position changes into an optical encoder signal pair (A/B) and a North Mark (NM) signal (one north marker per resolver electrical cycle). As will be appreciated, encoder data already is in digital form and, thus, data obtained from a feedback device embodied as an encoder may be directly entered into the control section for digital control.

The control section 14, for example, may use a 12-bit binary up/down encoder counter to indicate changes in feedback device input shaft. In this regard, as the encoder counter value increases, this is interpreted as the rotor rotating in one direction, and when the counter value decreases, this is interpreted as the rotor rotating in the opposite direction. The controller section 14 generates a north marker (NM) when the electrical cycle is at 90 degrees, e.g., cosine) (90°)=0 and sin)(90°=1 (the north markers are shown in FIG. 2, where NM1 and NM3 are actually the same marker in a 360 degree mechanical wrap around). Upon receiving the first NM signal, the controller section 14 sets the counter to 0, and thereafter the counter value will indicate the motor rotor mechanical position relative to that NM. For a feedback device embodied as an encoder, the NM may be generated directly from a marker signal provided by the encoder. It is noted that in FIG. 2, the region between L2 and L3 is the same region between L1 and L4 in a 360 degree wrap-around.

The control section 14 uses the mechanical position from the encoder counter to determine the electrical commutation required to generate the rotor torque and to turn the rotor in the most efficient way. Since, in the present example, the resolver has two electrical cycles per each mechanical revolution, the control section 14 only knows the relative position from the north marker. Therefore, the control section 14 does not know how to control the motor unless it knows whether the rotor is the first half (H1) or second half (H2) of mechanical rotational zones, as the required motor electrical command angles are 180 degrees (electrical) out of phase between H1 and H2 zones, shown in reference indicator 30.

During power up initialization, it must be determined which half of the mechanical rotational zones the rotor is currently in and convert the relative position feedback device into an absolute position. To determine the mechanical rotational zone using the feedback data, the motor rotor is commanded to 0 degrees electrical as a starting point. This would drive the motor to three possible positions, S1, S2 and S3, depending on the initial mechanical position, as shown in FIG. 2. As noted above, the region between L2 and L3 in FIG. 2 is the same region between L1 and L4 in a 360 degree wraparound. It is extended to help visualize the check point S3, which is the same location at 60 degree mechanical location between L1 and L4 (wraparound at 360 degrees).

The controller section 14, for example, divides a complete electrical rotor cycle (360 degrees electrical) into 256 steps, where each step represents about 1.4 degrees (360 degrees/

256) advance. The controller section 14 commands rotor rotation by issuing a 0 degree (S1, S2, or S3) command to the rotor and subsequent commands advancing the rotor one step a time, or about 1.4 degrees advance each predetermined time period (e.g., every 1.1 ms) until the controller section 14 has completed its needed total rotational angle.

After commanding the motor rotor to 0 degrees electrical, the control section 14 commands the rotor to advance forward 360 degrees electrical and additional 180 degrees electrical for commutation (one full resolver turn or one half mechanical revolution of the motor rotor for a 6-pole motor). This gets the rotor to its first check point. The control section 14 reads and stores rotor relative position from the encoder value, and based on this data, a determination is made with respect to which half of the cycle the rotor is in (the first half (H1) or second half (H2)). Then, to confirm that the determination is correct, the controller section 14 advances the rotor another 360 degrees electrical and reads the rotor position via the encoder value and then it advances the rotor one last time by 360 degrees electrical rotation and reads the encoder value, in both cases reading and storing rotor and feedback data. As discussed below, these second and third readings then are used to verify that the half cycle determination made during the initial 360°+180° cycle is in fact correct.

After the above rotation (1260 electrical degrees), the motor rotor should have made a minimum of a complete 360 degree mechanical turn. With continued reference to FIG. 2, if the rotor starts at S1, the three consecutive checkpoints will be C1, C2 and C3. If the rotor starts at S2, the three consecutive check points will be C2, C3 and C1. If the rotor starts at S3, the three consecutive check points will be C3, C1 and C2. The control section 14 checks the states of the three checkpoints C1, C2 and C3 through predefined logic and determines with confirmation which mechanical half (H1) and (H2) the rotor is in. As will be appreciated, the specific logic implemented in the test will vary based on the type of motor (e.g., 2-pole, 4-pole, 6-pole, etc.) and the type of position feedback device (e.g., the number of electrical cycles per mechanical revolution of the feedback device's input shaft) and whether position feedback device readings map unambiguously to the electrical angle for commutation.

To determine which mechanical half the rotor is in, the controller section 14 detects three angular rotations measurements A, B, and C, each from a NM, shown in FIG. 2. Instead of using the mechanical angle, the controller section 14 uses the electrical angles to represent the measured values A, B, C (in the present example, 3 electrical cycles for commutation make 1 mechanical turn, i.e., electrical angle for commutation in degrees=(mechanical angle in degrees *3) modulo 360).

A=180 degrees mechanical or 180 degrees electrical
B=120 degrees mechanical or 0 degrees (i.e. 360 degrees) electrical
C=60 degrees mechanical or 180 degrees electrical Note that at the checkpoints C1, C2 and C3, the encoder counter will contain a value corresponding only to either 0 degrees or 180 degrees electrical. To accommodate the potentially different NM locations relative to the electrical phases for different motor units, the controller section 14 uses 90 degrees to 270 degrees as the limits to check for 180 degrees, i.e. (180 degrees +/−90 degrees inclusive or 2nd or 3rd quadrants) and +/−90 degrees for 0 degrees, i.e. (0 degrees +/−90 degrees or 1st or 4th quadrants). As will be appreciated, these ranges are based on a feedback device that has three electrical cycles for commutation and two electrical cycles for resolver per one mechanical revolution. Feedback devices having different relationships (e.g., three electrical cycles per one mechanical rotation) may use different ranges, and such ranges would be readily apparent to one having ordinary skill in the art. In the present example, the controller section 14 expects to see one of three checks provide 0 degrees (i.e., within 1st or 4th quadrants) and remaining two checks provide electrical phase angles of 180 degrees (i.e., within 2nd or 3rd quadrants) after a complete 360 degree mechanical rotation.

In the present example, when all the position measurements are from the NM, the control section 14 will see exactly one occurrence of 0 degree electrical (H2) and two occurrences of 180 degree electrical indicating "H2 to H1" or "H1 to H2" transitions. Before the control section starts the motor, the current rotor position could be anywhere within the 360 degree mechanical angle. In most locations, the rotor will hit a NM before its first check point C1, C2 or C3 and therefore establishes a correct position relative to a NM and all subsequent checks will satisfy the logic that the resolver has indeed traveled through 360 degrees with H1 and H2 zones identified and motor control can proceed. However, there is a small region 36 around the location "X" in FIG. 2, coupled with certain resolver alignments relative to the 0 degree electrical also shown in FIG. 2, that the logic will fail. It is noted that FIG. 2 illustrates the failure region between 90 degrees and 180 degrees. However, failure may occur when the motor initial location is anywhere between 0 degrees and 180 degrees of the motor electrical cycle. The closer to 0 degrees the initial position is, the smaller the ambiguity window will become.

The reason for the failure is that when the control section 14 issues the first command for the rotor to go to the 0 degree electrical location, i.e., S1 in FIG. 2 when the initial rotor position is at X, it will take time for the rotor to go back to 0 degrees. While the rotor is rotating backward toward 0 degrees, the control section 14 continues to issue commands for moving the rotor forward at about 1.4 degrees increment every 1.1 ms. Eventually, the actual rotor position reaches the processor commanded position and the rotor moves forward in sync with the processor commands thereafter.

If for any reason, the first NM (marked as NM1 in FIG. 2) is to the right of 0 degrees but sufficiently close to 0 degrees as shown in FIG. 2, the rotor will not hit the first NM as the rotor rotates backward to meet the motor forward moving commands. As a result, the encoder counter will report an incorrect position Z instead of the correct position A (the position should be based on the first NM) when the rotor reaches the first check point. This is further explained below.

At power up the control section 14 initializes the optical encoder counter to 0. So initially, when the rotor starting point is at location X, the encoder counter value is 0. When the rotor is rotating backward, the counter starts to decrement the counts through FFFF, FFFE, etc. As will be appreciated, it will take a certain amount of time for the rotor to rotate backward and reach the NM. During this time, the control section is issuing commands to increment the rotor in the forward direction (e.g., commands issued every 1.1 ms to index 1.4 degrees). If the commanded position gets to the right of the first north marker NM1 before the rotor reaches the first north marker, then the first north marker NM1 will not be seen (i.e., the rotor will stop rotating backward and begin to follow the index commands, without hitting the first north marker NM1). Therefore, the encoder counter is not reset, and now will increment the counts and eventually it will reach the point X, i.e., the starting point in the present example. At this moment, the encoder counter will contain a value of 0 (i.e., it has returned to the starting point without the counter being reset). As the rotor keeps moving forward and reaches the first check point C1, the reported angle is Z, measured from point X, not A (point A is a desired value based on a NM).

Once the rotor reaches C1, the encoder counter reading is somewhere between 120 degrees and 149 degrees mechanical angle or 0 degrees (360 degrees) and 87 degrees electrical, reflecting the mechanical angle Z, from its starting position X. This implies that the rotor is currently in zone H2 based on the logic for detecting a location of the rotor as described above, instead of H1, and the next check point at C2, after passing a NM, again indicates it is in zone H2 and the finally at C3, a transition from H2 to H1. This contradicts what is expected, resulting in improper alignment and possible system error.

If the rotor starts in the small region that just precedes the area 36 (e.g., in the region 38), it may not hit the NM1, but it will give a correct angle range in the range of 151 degrees to 180 degrees mechanical or 93 degrees to 180 degrees electrical, indicating it is transitioning into another zone, as if it hit the first north marker. If the above scenario occurs, then the result is incorrect position reporting in a narrow mechanical angular range about 30 degrees to 60 degrees from NM1. In this instance, the rotor does not cross the first NM (NM1). In accordance with the present invention, the alignment of the relative position feedback device with the mechanical position of the motor rotor can be always correctly determined. More particularly, the motor rotor is turned an amount sufficient to compensate for ambiguity in the motor rotor position and locations of the markers in the feedback device prior to determining the position of the rotor relative to the feedback device markers. In other words, prior to moving the motor rotor to the initial location and indexing the rotor to the checkpoints, the motor rotor is rotated an amount greater than one full electrical cycle of the feedback device.

For example, for a 6-pole motor coupled to a resolver having two electrical cycles for each mechanical revolution, in order to achieve one complete electrical cycle of the resolver the motor must be commanded to rotate at least one half mechanical revolution (or 540 degrees electrical for a 6-pole motor). However, due to finite motor dynamic response, tolerance issues, etc., one half commanded revolution of the motor does not necessarily ensure that the resolver will complete one full electrical cycle, or actual mechanical half turn. Therefore, the motor must be rotated beyond one half mechanical revolution by an amount that takes into consideration dynamic response of the motor, alignment and tolerances of the feedback device. Preferably, the motor is rotated at least an additional 15 degrees mechanical (45 degrees electrical for a 6-pole motor). This way, the position reading at any check point is always referenced to a NM unless actual hardware failure occurs.

It is noted that such additional rotation is utilized when the feedback device electrical cycles per mechanical revolution are greater than 1. If the feedback device has one electrical cycle per mechanical revolution, the additional rotation is not required as such feedback device is an absolute feedback device.

Figure 3:
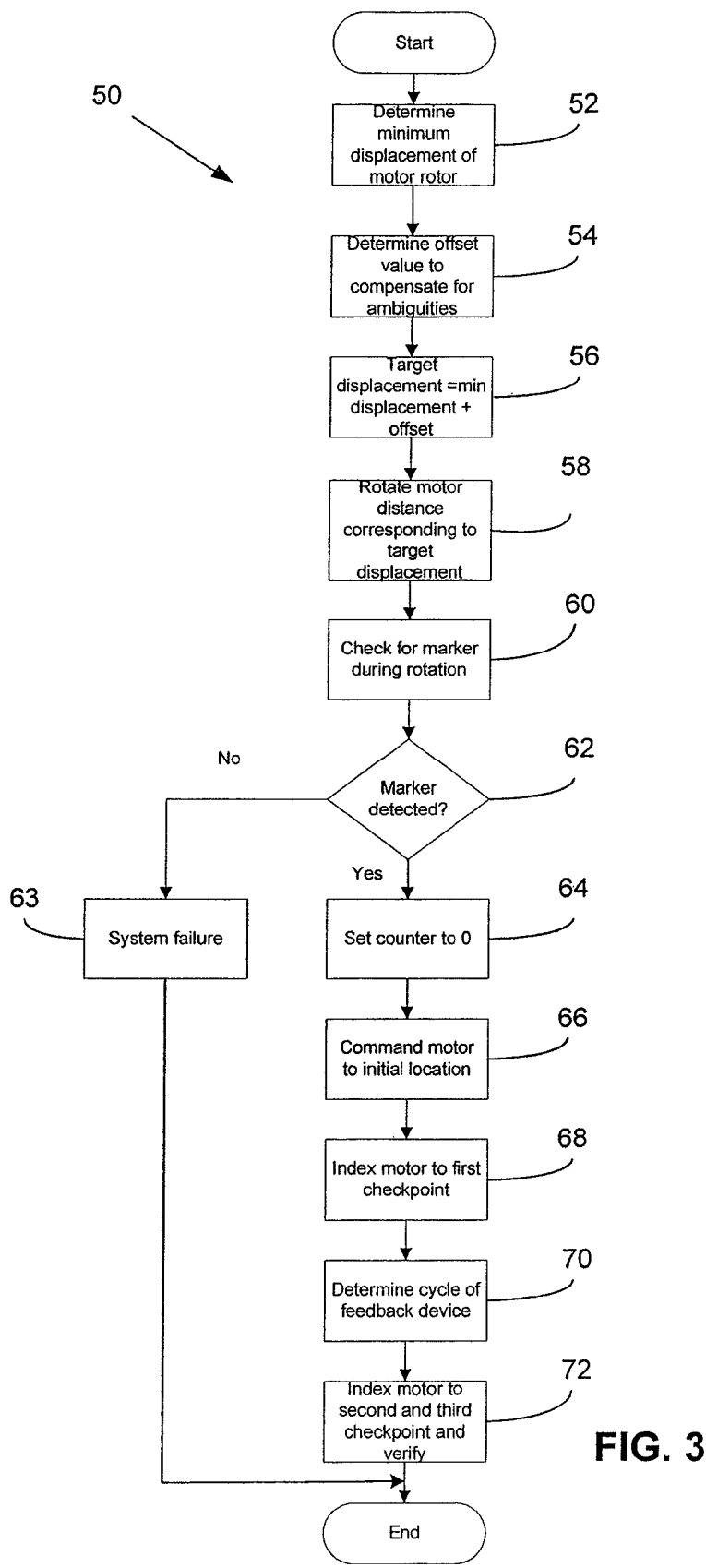
FIG. 3 is a flow chart illustrating exemplary steps for carrying out a method of aligning a feedback device with a rotating member in accordance with the invention.

With additional reference to FIG. 3, illustrated are logical operations to implement an exemplary method of configuring a relative position feedback device as an absolute position feedback device. The flow chart 50 of FIG. 3 may be thought of as depicting steps of a method carried out by the control section 14. Although FIG. 3 shows a specific order of executing functional logic blocks, the order of executing the blocks may be changed relative to the order shown. Also, two or more blocks shown in succession may be executed concurrently or with partial concurrence. Certain blocks also may be omitted, e.g. whether confirmation is required. In addition, any number of functions, logical operations, commands, state variables, semaphores or messages may be added to the logical flow for purposes of enhanced utility, accounting, performance, measurement, troubleshooting, and the like. It is understood that all such variations are within the scope of the present invention.

Beginning with block 52, a determination is made with respect to the electrical displacement of the motor rotor that corresponds to one full electrical cycle of the feedback device. This displacement is referred to as the minimum displacement. Such determination can be made, for example, by determining the number of mechanical revolutions of the feedback device input shaft that produce one complete electrical cycle of the feedback device. For an X2 resolver, for example, two electrical cycles are completed for each mechanical revolution. Therefore, the feedback device input shaft will need to rotate one half of a revolution to produce one electrical cycle. Since the motor is coupled to the feedback device without any gear reduction, the motor also would need to rotate one half of a mechanical revolution. Since in the present example the motor is a 6-pole motor, this corresponds to 540 electrical degrees. Determination of this minimum displacement can be performed manually and provided to the control section 14, or it can be automatically calculated based on known parameters of the feedback device and motor (e.g., motor and feedback device setup data).

Next at block 54, a determination is made with regard to an additional displacement that the motor rotor will undergo to ensure that, even though motor dynamics and tolerance issues come into play, the feedback device will at least complete one electrical cycle. In other words, the additional displacement of the motor rotor compensates for any ambiguities in the motor system. Such ambiguities can vary from system to system and, thus, a determination of the offset value should be performed on a system-by-system basis. For a 6-pole motor during open loop operation and during a predetermined time period that the motor is commanded forward, the minimum offset will be 180 degrees of electrical angle for commutation minus the minimum net forward motion the motor will realize when the command position meets the actual motor position if the motor initial position is slightly less than 180 degrees electrical angle for commutation (or 60 degrees mechanical angle—this is shown in FIG. 2 at reference indicator 36) Such determination can be made using conventional techniques and is well within the capabilities of a person having ordinary skill in the art.

At block 56, the additional displacement of the motor rotor, which is referred to as an offset value, is added to electrical displacement determined in step 52 to derive a target value. Preferably, the offset value should also include additional margins to compensate for environmental conditions, load variations of the motor rotor. In the worst case, a maximum of one-half additional electrical cycle for commutation of the motor rotor would be sufficient to address the ambiguity. Next at block 58, the motor rotor is commanded to rotate the distance specified in the target value, wherein rotation of the motor rotor may be performed using an open-loop control methodology.

During rotation of the motor rotor, the control section 14 checks for the north marker as indicated at block 60. With the offset value at block 56 in place, the north marker detection is certain unless the position feedback device and/or its interface have failures. At block 62, if the north marker is not detected, then the method indicates the position feedback device and/or its interface has failure as indicated at block 63. If at block 62 the north marker is detected, then at block 64 the optical encoder counter is properly referenced to the north marker and the resolver feedback signal can be used to determine which cycle the motor rotor is in. For each electrical angle for commutation, there are three possible readings (+/- tolerances) of the resolver angles for the example given in FIG. 2. By checking the resolver feedback angle, the motor rotor cycle is uniquely determined. For example, at block 66 the motor rotor is commanded to an initial position beyond the target rotation. Preferably, the initial position is a beginning of one of the electrical cycles of the motor. For example, in the case of a 6-pole motor as shown in FIG. 2, the initial position can be S1 (0 degrees electrical, 0 degrees mechanical), S2 (360 degrees electrical, 120 degrees mechanical) or S3 (720 degrees electrical, 240 degrees mechanical).

Moving to block 68, the motor rotor is indexed to the first checkpoint C1. At the first checkpoint, data is collected regarding the motor rotor position and the feedback device position, and this data is used at block 70 to determine which cycle the motor rotor is in (for an X2 resolver, it is determined which half cycle the motor rotor is in) by checking the resolver reading against what is expected in each of half cycle, illustrated in C1, C2 and C3 of FIG. 2 and described herein. If the resolver reading is around 0 degrees, the rotor is crossing the first half and second half boundary; if the resolver reading is around 240 degrees, the rotor is in the second half; if the resolver reading is around 120 degrees, the rotor is in the first half. Then at block 72 the motor rotor is indexed to the second checkpoint C2 and motor data and feedback data are collected, and then the motor rotor is indexed to the third checkpoint C3 and motor data and feedback data again are collected. The data collected at the second and third checkpoints C2 and C3 is used to verify that the half-cycle determination of the motor rotor. Once verified, alignment of the motor rotor to the relative position feedback device is complete. For a working motor, blocks 66 through 72 are optional.

Accordingly, a device and method in accordance with the present invention enable robust rotational positional alignment using a relative position feedback device. The device and method enable the use of feedback devices having multiple feedback electrical cycles per mechanical revolution, thereby enhancing accuracy, while providing characteristics of an absolute position feedback device Computer program elements of the invention may be embodied in hardware and/or in software (including firmware, resident software, micro-code, etc.). In a preferred embodiment, logic that carries out the method shown in FIG. 3 is stored in memory 14b and executable by the processor 14a so as to carry out the alignment method in accordance with the invention. The invention may take the form of a computer program product, which can be embodied by a non-transitory computer-usable or computer-readable storage medium having computer-usable or computer-readable program instructions, "code" or a "computer program" embodied in the medium for use by or in connection with the instruction execution system. The computer-usable or computer-readable medium may be, for example but not limited to, an electronic, magnetic, optical, electromagnetic, infrared, or semiconductor system, apparatus, or device. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

In addition, the invention is considered to reside in all workable combinations of features herein disclosed, whether initially claimed in combination or not and whether or not disclosed in the same embodiment.

What is claimed is:

1. A device for aligning a relative position feedback device to a motor rotor, wherein a rotatable input of the relative position feedback device is coupled to the motor rotor so as to rotate therewith, the relative position feedback device having at least one marker indicative of a location of the rotatable input within one electrical cycle of the relative position feedback device, comprising:
   a processor and memory operatively coupled to the processor; and
   logic stored in the memory and executable by the processor so as to cause the processor to:
   rotate the motor rotor a distance corresponding to
      a non-zero offset angular distance, plus
      a predetermined angular distance corresponding to one electrical cycle of the relative position feedback device;
   while the motor rotor is rotating, initialize a counter upon detection of the at least one marker;
   command the motor rotor to at least one predetermined angular location;
   obtain data stored in the counter at the at least one predetermined angular location; and
   based on the obtained data, determine a location of the motor rotor relative to the at least one marker.

2. The device according to claim 1, wherein the logic that commands the motor rotor to at least one predetermined angular location includes logic that commands the motor rotor to the at least one predetermined angular location after the motor rotor has rotated the predetermined angular distance and the offset angular distance.

3. The device according to claim 1, wherein the offset angular distance corresponds to at least one of dynamics of the motor, a load coupled to the motor, or tolerances of the feedback device.

4. The device according to claim 1, wherein the logic that commands the motor rotor to at least two predetermined angular locations includes logic that:
   commands the motor rotor to an initial location; and
   after a predetermined time period, commands the motor to index to at least one check point.

5. The device according to claim 4, wherein the logic that commands the motor rotor to an initial location comprises logic that commands the motor rotor to a location corresponding to 0 degrees of the motor rotor electrical cycle.

6. The device according to claim 1, further comprising a control loop for controlling rotation of the motor rotor, wherein the control loop comprises an open-loop control methodology.

7. The device according to claim 1, further comprising logic that verifies the determined relationship of the motor rotor relative to the at least one marker.

8. A drive system, comprising:
the device according to claim 1; and
the relative position feedback device having a plurality of electrical cycles for each mechanical revolution of the rotatable input.

9. The system according to claim 8, wherein the relative position feedback device is at least one of a resolver or an optical type of encoder.

10. A method for aligning a relative position feedback device to a motor rotor, wherein a rotatable input of the relative position feedback device is coupled to the motor rotor so as to rotate therewith, the relative position feedback device having at least one marker indicative of a location of the rotatable input within one electrical cycle of the relative position feedback device, comprising:
rotating the motor rotor a distance corresponding to
a non-zero offset angular distance, plus
a predetermined angular distance corresponding to one electrical cycle of the relative position feedback device;
while the motor rotor is rotating, initializing a counter upon detection of the at least one marker;
commanding the motor rotor to at least one predetermined angular location;
obtaining data stored in the counter at the at least one predetermined angular location; and
based on the obtained data, determining a location of the motor rotor relative to the at least one marker.

11. The method according to claim 10, wherein the commanding step is performed after the motor rotor has rotated the predetermined angular distance and the offset angular distance.

12. The method according to claim 10, wherein the offset angular distance corresponds to at least one of dynamics of the motor, a load coupled to the motor, or tolerances of the feedback device.

13. The method according to claim 10, wherein commanding the motor comprises:
commanding the motor rotor to an initial location; and
after a predetermined time period, commanding the motor to index to at least one check point.

14. The method according to claim 13, wherein commanding the motor to an initial location comprises commanding the motor rotor to a location corresponding to 0 degrees of the motor rotor electrical cycle.

15. The method according to claim 10, wherein the relative position feedback device has a plurality of electrical cycles for each mechanical revolution of the rotatable input.

16. The method according to claim 10, wherein the relative position feedback device is at least one of a resolver or an encoder.

17. The method according to claim 10, wherein rotating includes rotating the motor shaft using an open-loop control methodology.

18. The method according to claim 10, further comprising verifying the determined relationship of the motor rotor relative to the at least one marker.

19. The method according to claim 10, wherein the offset angular distance is between 0 degrees and 180 degrees of the motor rotor electrical cycle for commutation.

* * * * *